United States Patent
Journade et al.

(10) Patent No.: US 10,239,627 B2
(45) Date of Patent: Mar. 26, 2019

(54) AIRCRAFT ENGINE UNIT COMPRISING AN IMPROVED FRONT ENGINE ATTACHMENT

(71) Applicant: Airbus Operations SAS, Toulouse (FR)

(72) Inventors: Frederic Journade, Toulouse (FR); Eric Renaud, Brignemont (FR); Laurent Agostini, Fontenilles (FR)

(73) Assignee: Airbus Operations SAS, Toulouse (FR)

( * ) Notice: Subject to any disclaimer, the term of this patent is extended or adjusted under 35 U.S.C. 154(b) by 248 days.

(21) Appl. No.: 15/252,585

(22) Filed: Aug. 31, 2016

(65) Prior Publication Data
US 2017/0057652 A1 Mar. 2, 2017

(30) Foreign Application Priority Data

Sep. 2, 2015 (FR) ...................................... 15 58137

(51) Int. Cl.
*B64D 27/26* (2006.01)
*B64D 27/18* (2006.01)
*F02C 7/20* (2006.01)

(52) U.S. Cl.
CPC ............. *B64D 27/26* (2013.01); *B64D 27/18* (2013.01); *F02C 7/20* (2013.01); *B64D 2027/266* (2013.01); *B64D 2027/268* (2013.01); *Y02T 50/671* (2013.01)

(58) Field of Classification Search
CPC .............. B64D 27/26; B64D 2027/266; B64D 2027/268; B64D 27/18; F02C 7/20
See application file for complete search history.

(56) References Cited

U.S. PATENT DOCUMENTS

| 4,013,246 A | * | 3/1977 | Nightingale | B64D 27/18 244/54 |
| 4,603,821 A | * | 8/1986 | White | B64D 27/18 244/54 |
| 6,398,161 B1 | * | 6/2002 | Jule | B64D 27/18 244/54 |
| 7,232,091 B2 | * | 6/2007 | Marche | B64D 27/26 244/54 |

(Continued)

FOREIGN PATENT DOCUMENTS

| EP | 1571081 | 9/2005 |
| EP | 2639159 | 9/2013 |
| FR | 2963320 | 2/2012 |

OTHER PUBLICATIONS

French Search Report, dated Jul. 15, 2016, priority document.

*Primary Examiner* — Philip J Bonzell
(74) *Attorney, Agent, or Firm* — Greer, Burns & Crain Ltd.

(57) ABSTRACT

An aircraft engine unit comprising an engine, a mast and an engine connection connecting the engine and the mast. The aircraft engine unit includes a front engine attachment of the engine connection which comprises at least one front rod connecting the primary structure of the mast and the core of the engine and which assures the take-up of vertical forces, and at least one connection connecting the primary structure of the mast and the fan casing of the engine and which assures the take-up of forces that are horizontal and perpendicular to the axis of rotation of the engine and/or a torque about the axis of rotation of the engine.

5 Claims, 3 Drawing Sheets

(56) References Cited

U.S. PATENT DOCUMENTS

| | | | | |
|---|---|---|---|---|
| 7,624,945 B2 * | 12/2009 | Diochon | ............... | B64D 27/26 244/54 |
| 7,770,840 B2 * | 8/2010 | Diochon | ............... | B64D 27/26 244/53 R |
| 8,042,342 B2 * | 10/2011 | Diochon | ............... | B64D 27/26 244/54 |
| 8,104,708 B2 * | 1/2012 | Chouard | ............... | B64D 27/26 244/54 |
| 8,215,580 B2 * | 7/2012 | Balk | ............ | B64D 27/26 244/54 |
| 9,637,241 B2 * | 5/2017 | Schnelz | ............... | B64D 27/26 |
| 2005/0194493 A1 | 9/2005 | Marche | | |
| 2013/0240666 A1 | 9/2013 | Schnelz | | |

\* cited by examiner

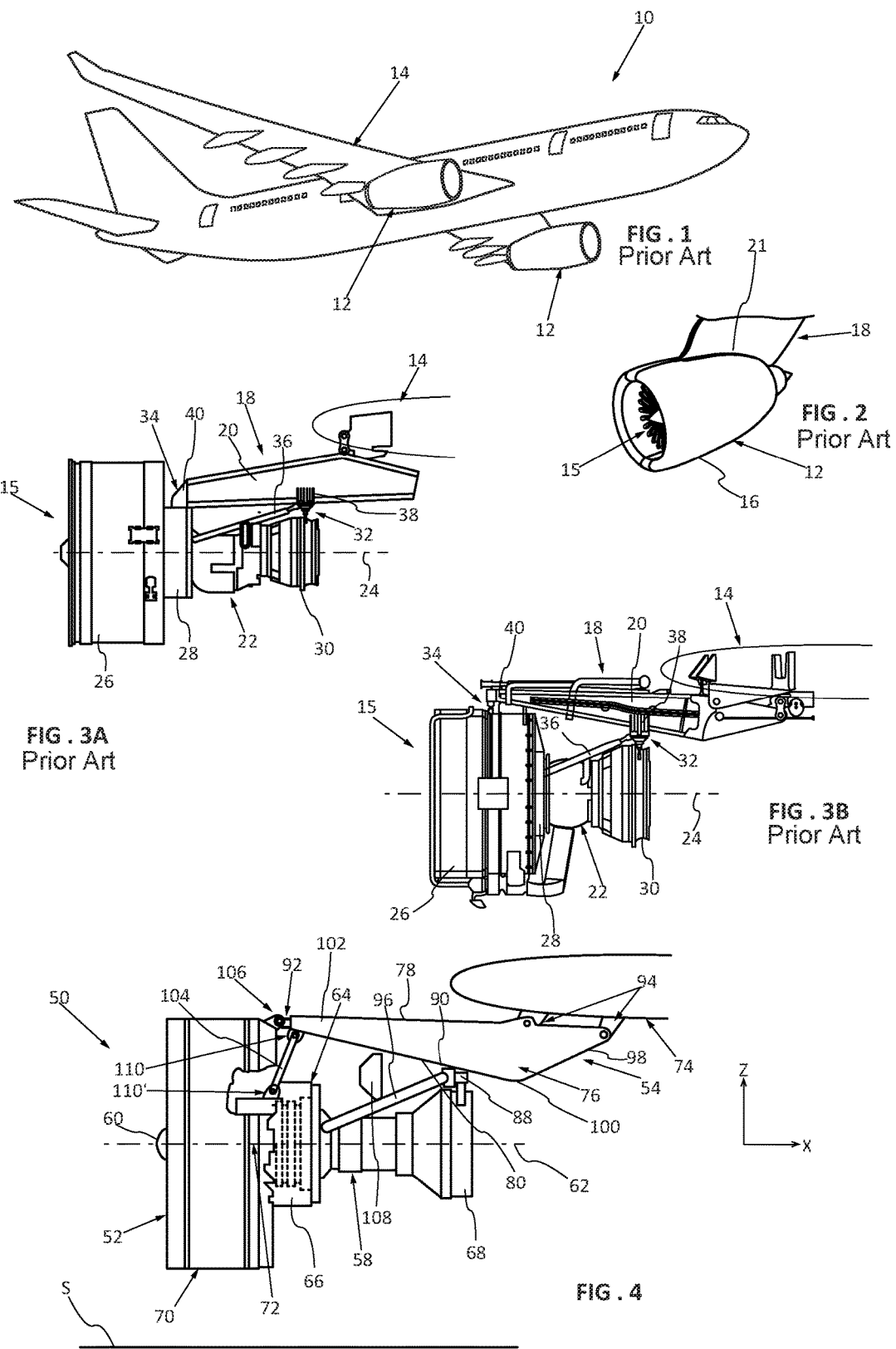

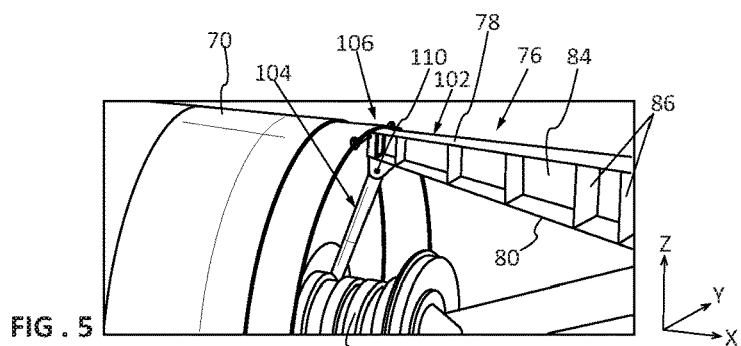
FIG. 5
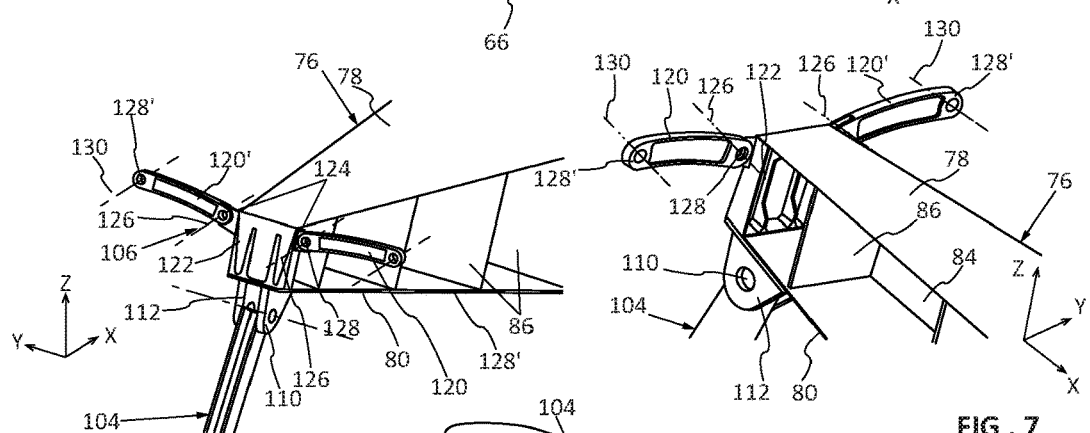
FIG. 6
FIG. 7
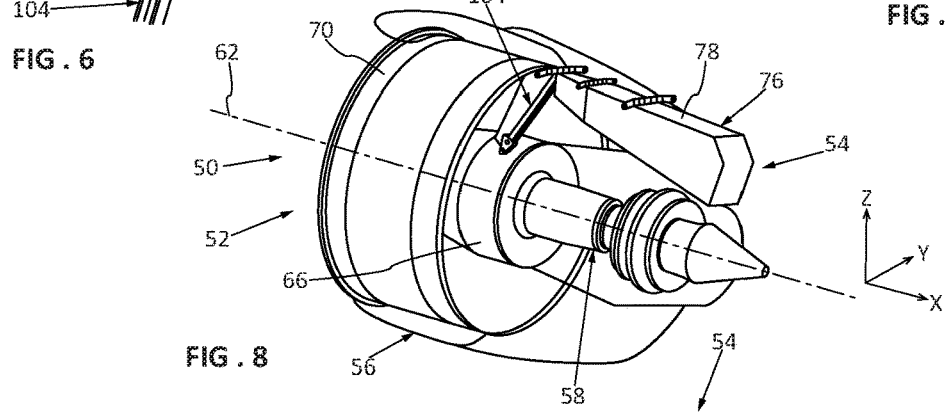
FIG. 8
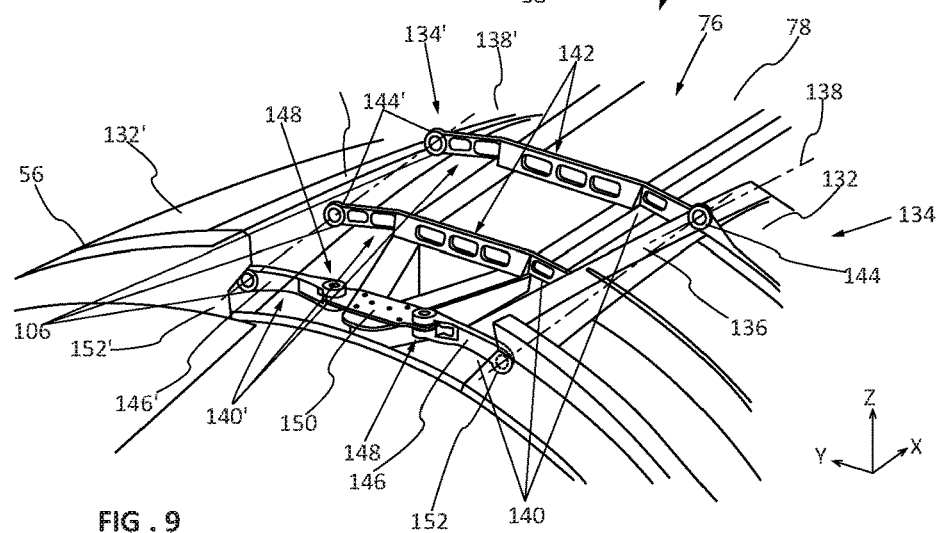
FIG. 9

AIRCRAFT ENGINE UNIT COMPRISING AN IMPROVED FRONT ENGINE ATTACHMENT

CROSS-REFERENCES TO RELATED APPLICATIONS

This application claims the benefit of the French patent application No. 15 58137 filed on Sep. 2, 2015, the entire disclosures of which are incorporated herein by way of reference.

BACKGROUND OF THE INVENTION

The present invention relates to an aircraft engine unit comprising an improved front engine attachment.

As illustrated in FIGS. 1 and 2, an aircraft 10 comprises a plurality of engine units 12 which are positioned below the wing 14 of the aircraft 10 in accordance with a configuration.

As illustrated in FIG. 2, an engine unit 12 comprises an engine 15, a nacelle 16 positioned around the engine 15 and a mast 18 which assures the connection between the engine 15 and the rest of the aircraft 10, in particular the wing 14.

As illustrated in FIGS. 3A and 3B, the mast 18 comprises a rigid primary structure 20 which assures, amongst other things, the transmission of forces between the engine 15 and the rest of the aircraft 10, and a secondary structure 21 which surrounds the primary structure 20 and which limits the drag of the mast.

The present invention is aimed more particularly at aircraft engines of the bypass turbojet type. As illustrated in FIGS. 3A and 3B, this type of engine 15 comprises a core 22 which, in particular, comprises a rotor that pivots relative to a stator about an axis of rotation 24, and a fan casing 26 which has an approximately cylindrical shape and in which there is positioned a fan connected to the rotor of the core 22 of the engine.

Throughout the description, the terms front and rear refer to the direction of the flow of gases, the front corresponding to the intake of gases (air) into the engine and the rear corresponding to the exhaust of gases (combustion gases). In addition, an intermediate part of an element corresponds to a part disposed between a front part and a rear part. The terms top and bottom refer to the connections between the mast and the rest of the aircraft, the top corresponding to the connection between the mast and the wing of the aircraft and the bottom corresponding to the connection between the mast and the engine.

The core 22 extends from a front casing 28 comprising an air intake to a rear casing 30 comprising a combustion gas exhaust.

In accordance with one design, the primary structure 20 of the mast 18 is connected to the engine 15 by a connection which comprises a rear engine attachment 32, a front engine attachment 34, and a pair of thrust rods 36 which assure a take-up of the thrust forces.

In accordance with a first variant illustrated by FIG. 3A and described in document FR-2.963.320, the rear engine attachment 32 connects an intermediate part 38 of the primary structure 20 of the mast 18 and the rear casing 30 of the core 22 of the engine 15, the front engine attachment 34 connects the front end 40 of the primary structure 20 of the mast 18 and the front casing 28 of the core 22 of the engine 15, and the thrust rods 36 connect the intermediate part 38 of the primary structure 20 and the front casing 28 of the core 22 of the engine. In accordance with a first disadvantage associated with this variant, the zone situated between the core 22 of the engine and the primary structure 20 is reduced and does not allow the integration of additional pieces of engine equipment, which are consequently positioned above the primary structure 20 of the mast. This arrangement leads to an increase in the volume of the secondary structure 21 and affects the drag of the aircraft.

In accordance with another disadvantage, this variant results in a relatively significant distance between the core 22 of the engine and the wing 14.

In accordance with a second variant illustrated by FIG. 3B, the front engine attachment 34 connects the front end 40 of the primary structure 20 of the mast 18 and the fan casing 26. This solution increases the zone situated between the core 22 of the engine and the primary structure 20, which makes it possible to house additional pieces of engine equipment there. This variant also results in a reduction of the distance between the core 22 of the engine and the wing 14. However, because the front end 40 of the primary structure 20 is positioned above the fan housing 26, this second variant limits the diameter of the fan housing 26. This diameter is tending to grow more and more due to the rise in the dilution ratio of new engines.

SUMMARY OF THE INVENTION

The present invention aims to overcome the disadvantages of the prior art.

To this end, the invention relates to an aircraft engine unit comprising an engine, a mast and a nacelle in which there is positioned the engine, the engine comprising:

a core which comprises a stator and a rotor, the rotor pivoting about an axis of rotation relative to the stator,
a fan connected to the rotor and positioned in a fan housing, the mast comprising a primary structure connected to the engine by an engine connection which comprises:

a rear engine attachment which connects an intermediate part of the primary structure and the core of the engine,
a front engine attachment which connects a front end of the primary structure and the engine, and
at least two thrust rods.

In accordance with the invention, the aircraft engine unit is characterized in that the front engine attachment comprises at least one connection which connects the primary structure of the mast and the fan casing of the engine, and at least one front rod which connects the primary structure of the mast and the core of the engine, and in that each front rod is connected at a first end to a front end of the primary structure of the mast by a connection pivoting about a horizontal axis perpendicular to the axis of rotation of the engine and is connected at a second end to the core of the engine by a connection pivoting about a horizontal axis perpendicular to the axis of rotation of the engine.

In accordance with a first advantage, this configuration makes it possible to be able to house at least one additional piece of equipment in a zone situated between the core of the engine and the primary structure of the mast.

In accordance with another advantage, because the front end is offset vertically relative to the rear engine attachment, the distance separating the core of the engine and the wing is reduced.

In accordance with another advantage, the diameter of the fan housing determining the dilution ratio of the engine is not limited by the distance separating the front end of the primary structure of the mast and the ground.

In accordance with another advantage, the forces associated with the weight of the engine are taken up by the front rod at the core of the engine, which tends to reduce the stresses on the fan casing.

The front rod is preferably connected to a part of the stator, and the orientation of the front rod is convergent with the axis of rotation in a plane perpendicular to the axis of rotation, the plane containing a front bearing assuring the guidance in rotation of the rotor relative to the stator and positioned further to the front of the engine.

In accordance with a further feature, the connection which connects the primary structure of the mast and the fan casing comprises at least one pair of connection elements disposed in a plane perpendicular to the axis of rotation, each connection element of the pair being symmetrical to the other connection element with respect to the primary structure, each connection element being connected on the one hand to the primary structure and on the other hand to the fan casing or to at least one element of the nacelle rotationally fixed about the axis of rotation relative to the fan casing.

In accordance with a first variant, the connection comprises two lateral rods, each of which comprises a first end connected to the primary structure by a connection pivoting about an axis parallel to the axis of rotation and a second end connected to the fan casing by a connection pivoting about an axis parallel to the axis of rotation.

In accordance with a second variant, the connection comprises at least one first connection element connecting a first cowling of the nacelle to the primary structure of the mast and at least one second element connecting a second cowling of the nacelle to the primary structure of the mast, the first and second cowlings being rotationally fixed about the axis of rotation relative to the fan casing.

In accordance with a first embodiment, the first and second connection elements are present in the form of at least one bracket disposed in a plane perpendicular to the axis of rotation, comprising a central part fixed to the primary structure of the mast and extending on either side of the primary structure, symmetrically, the bracket comprising ends connected to the first and second cowlings of the nacelle.

In accordance with a second embodiment, the first and second connection elements are lateral rods disposed on either side of the primary structure, each lateral rod comprising a first end connected by means of a joint to the primary structure and a second end connected to one of the cowlings. Each joint is preferably a pivot connection with a vertical pivot axis.

The invention also relates to an aircraft comprising at least one engine unit according to the invention.

BRIEF DESCRIPTION OF THE DRAWINGS

Further features and advantages will become clear from the following description of the invention, which is given solely by way of example with reference to the accompanying drawings, in which:

FIG. 1 is a perspective view of an aircraft,

FIG. 2 is a perspective view of an aircraft engine unit,

FIG. 3A is a view from the side of an aircraft engine unit without nacelle, illustrating a first variant of the prior art, FIG. 3B is a view from the side of an aircraft engine unit without nacelle, illustrating a second variant of the prior art, FIG. 4 is a view from the side of an aircraft engine unit without nacelle, schematically illustrating the invention, FIG. 5 is a perspective view of a front engine attachment, illustrating a first variant of the invention, FIG. 6 is a perspective view in accordance with a first viewing angle of the front end of a primary structure of a mast, illustrating the first variant of the invention, FIG. 7 is a perspective view in accordance with a second viewing angle of the front end of the primary structure visible in FIG. 6, FIG. 8 is a perspective view of a front engine attachment, illustrating a second variant of the invention, FIG. 9 is a perspective view from above of an engine unit, illustrating the second variant of the invention.

DETAILED DESCRIPTION OF THE PREFERRED EMBODIMENTS

Figure 10:
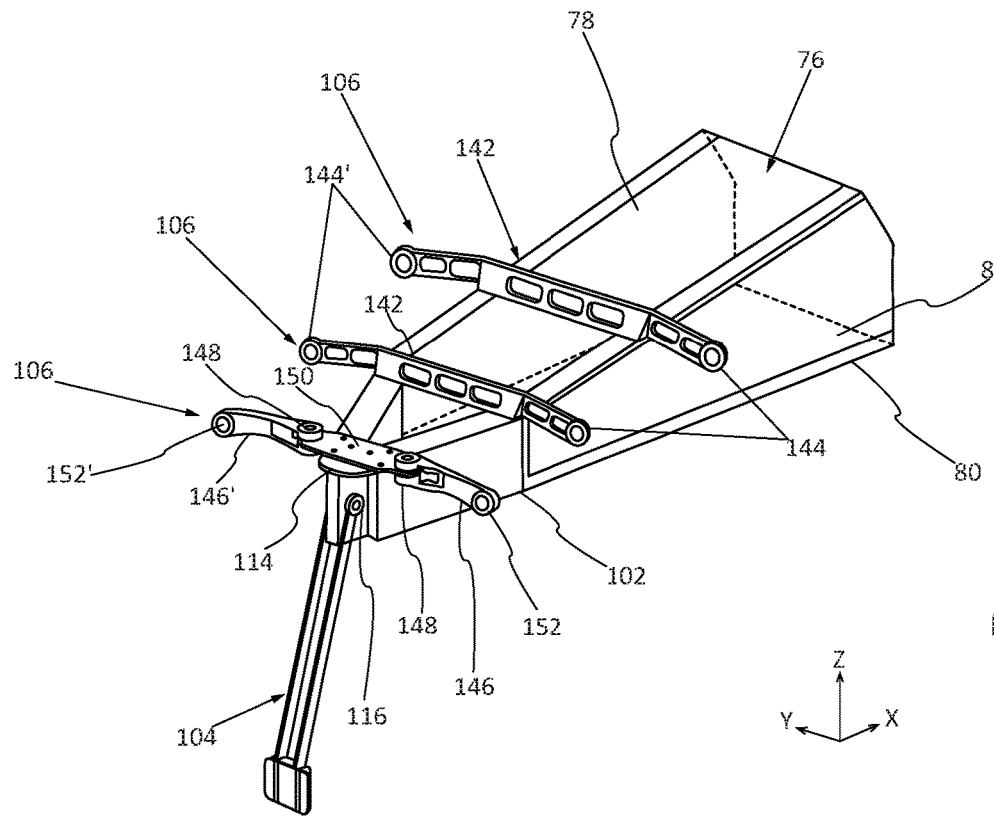
FIG. 10 is a perspective view of the front end of a primary structure of a mast, illustrating the second variant of the invention.

In FIGS. 4, 8 and 9, reference sign 50 denotes an engine unit of an aircraft, which engine unit comprises an engine 52, a mast 54 and a nacelle 56 (only visible in part in FIGS. 8 and 9).

In accordance with one embodiment, the engine 52 is a bypass turbojet. It comprises:

a core 58 which comprises a rotor 60 pivoting about an axis of rotation 62 relative to a stator 64 which comprises a front casing 66 with an air inlet and a rear casing 68 with a combustion gas exhaust, a fan connected to the rotor 60 and positioned in a fan casing 70 connected to the front casing 66 by radial arms.

The front casing 66, rear casing 68 and fan casing 70 are approximately concentric with the axis of rotation 62. In addition, the engine 52 comprises bearings assuring the guidance in rotation of the rotor 60 relative to the stator 64. One of the bearings is positioned further to the front of the engine 52, inside the front casing 66, and is referred to as the front bearing 72.

For the following description, an axis X coincides with the axis of rotation 62 of the engine 52, an axis Y is perpendicular to the axis X and horizontal, and an axis Z is perpendicular to the axis X and vertical. A vertical longitudinal plane contains the axis X and the axis Z, a horizontal longitudinal plane contains the axis X and the axis Y, and a transverse plane is a plane perpendicular to the axis X.

In accordance with a configuration illustrated by FIG. 4, the mast 54 makes it possible to connect the engine unit 50 to a wing 74, the engine unit 50 being positioned below the wing 74.

The mast 54 comprises a primary structure 76 positioned in a fairing (not shown) which confers aerodynamic properties to the mast 54. In accordance with one embodiment, the primary structure 76 is a box-like structure comprising an upper stringer 78, a lower stringer 80, side panels 84 and stiffeners 86.

The primary structure 76 is connected by a wing connection 94 to the wing 74 and is connected by an engine connection to the engine 52.

In accordance with one configuration, the engine connection comprises a rear engine attachment 88 which connects an intermediate part 90 of the primary structure 76 and the core 58 of the engine 52, more particularly the rear casing 68. The engine connection also comprises a front engine attachment 92 which connects a front end 102 of the primary structure 76 and the engine 52. Lastly, the engine connection also comprises at least two thrust rods 96 disposed symmetrically with respect to the vertical longitudinal plane and which connect the intermediate part 90 of the primary structure 76 and the core 58 of the engine 52, more particularly the front casing 66.

In accordance with one embodiment, the primary structure 76 of the mast has an approximately triangular section in a vertical longitudinal plane, a substantially horizontal first side of said section forming the upper stringer 78, the lower stringer 80 forming a second side of the triangle positioned to the front, a rear stringer 98 (visible in FIG. 4) connecting the upper stringer 78 and lower stringer 80. The lower stringer 80 and the rear stringer 98 are connected at a bottom edge 100 offset downwardly relative to the upper stringer 78.

The upper stringer 78 and the lower stringer 80 are joined or are separated by a short distance at the front end 102.

In accordance with one embodiment, in a view from above the side edges of the upper stringer 78 and lower stringer 80 are convergent toward the front, such that the front end 102 forms a point oriented toward the front.

The front engine attachment 92 is positioned at the front end 102 of the primary structure 76 of the mast 54, and the rear engine attachment 88 is positioned at the lower stringer 80 in the proximity of the bottom edge 100.

In accordance with one feature of the invention, the front engine attachment 92 comprises at least one front rod 104 which connects the primary structure 76 of the mast 54 and the core 58 of the engine 52, and at least one connection 106 which connects the primary structure 76 of the mast 54 and the fan casing 70.

In accordance with this configuration, the front end 102 of the primary structure 76 of the mast 54 is spaced from the core 58 of the engine 52, which makes it possible to house at least one additional piece of equipment 108 in a zone situated between the core 58 of the engine and the primary structure 76. Thus, this configuration tends to reduce the volume enclosed by the fairing of the mast 54 and therefore tends to limit the impact on the aerodynamic properties of the engine unit 50.

In accordance with another advantage, because the front end 102 is offset vertically relative to the rear engine attachment 88, the distance separating the core 58 of the engine 52 and the wing 74 is reduced.

In accordance with another advantage, the front end 102 of the primary structure 76 of the mast 54 is offset toward the rear relative to the fan casing 70 and is no longer positioned above said fan casing 70. Consequently, the diameter of the fan casing 70 determining the dilution ratio of the engine 52 is no longer limited by the distance separating the front end 102 of the primary structure 76 of the mast 54 and the ground S.

In accordance with another advantage, the forces along the axis Z are taken up by the front rod 104 at the core 58 of the engine 52, which tends to reduce the stresses on the fan casing 70. In accordance with one embodiment, the front engine attachment 92 comprises a sole front rod 104 connected to the front end 102 of the primary structure 76 of the mast 54 and disposed in the vertical longitudinal plane. With the presence of a plurality of front rods 104, these are disposed symmetrically with respect to the vertical longitudinal plane.

Each front rod 104 is preferably connected at each of its ends either to the primary structure 76 or to the engine 52 by a joint allowing at least 1° of freedom in the direction of the axis Y. The front rod 104 thus assures the take-up of forces in the direction of the axis Z.

Each end of each front rod 104 advantageously pivots relative to an axis of rotation 110, 110' parallel to the axis Y.

In accordance with an embodiment visible in FIGS. 6 and 7, the front end 102 of the primary structure 76 of the mast 54 comprises a clevis 112 with two tabs disposed on either side of the front rod 104, and a first end of the front rod 104 comprises a bore through which the axis of rotation 110 passes supported by the clevis 112.

In accordance with another embodiment visible in FIG. 10, the front end 102 comprises a connection plate 114 disposed in the vertical longitudinal plane. The connection plate 114 comprises a bore through which an axis of rotation 110 passes which is supported by a clevis 116 connected to the front bore 104.

Figure 11:
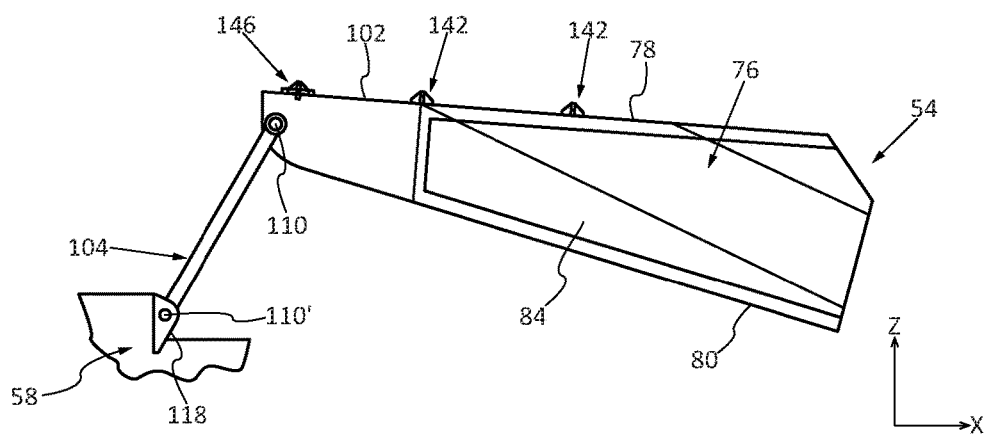
FIG. 11 is a view from the side of the front end of the primary structure visible in FIG. 10.

In accordance with an embodiment visible in FIGS. 10 and 11, a clevis 118 connected to the core 58 of the engine 52 comprises two tabs which support an axis of rotation 110', a second end of the front rod 104 comprising a bore through which the axis of rotation 110' passes.

The front rod 104 is preferably connected to part of the stator 64 such that the orientation of the front rod 104 is convergent with the axis X in a transverse plane containing the front bearing 72. Thus, the flexion between the rotor 60 and the stator 64 is reduced.

In accordance with a first variant visible in FIGS. 5 to 7, the connection 106 of the front engine attachment 92 directly connects the primary structure 76 and the fan casing 70.

The connection 106 preferably comprises two lateral rods 120, 120' disposed in a transverse plane, on either side of the primary structure 76.

Each lateral rod 120, 120' is connected at a first end to the front end 102 of the primary structure 76 of the mast 54 and at a second end to the fan casing 70. Each end of each lateral rod 120, 120' is connected either to the front end 102 or to the fan casing 70 by a joint.

In accordance with one embodiment, the front end 102 of the primary structure 76 of the mast 54 comprises a plate 122 with ears 124 on either side, each of which is connected to a lateral rod 120, 120' via an axis of rotation 126 parallel to the axis X. In accordance with this embodiment, each lateral rod 120, 120' can pivot about the axis of rotation 126 in a transverse plane. The plate 122 preferably comprises the clevis 112 connected to the front rod 104.

Each lateral rod 120, 120' comprises, at each end, bores 128, 128' oriented in accordance with the axis X, one bore 128 accommodating the axis of rotation 126 connected to the primary structure 76 and one bore 128' accommodating an axis of rotation 130 connected to the fan casing 70.

In accordance with a second variant visible in FIGS. 8 to 11, the connection 106 of the front engine attachment indirectly connects the primary structure 76 and the fan casing 70.

The nacelle 56 is on the one hand connected to the mast 54, more particularly to the primary structure 76 of the mast 54, and on the other hand is rotationally fixed about the axis X relative to the fan casing 70.

In accordance with one embodiment, the nacelle 56 comprises two cowlings 132 and 132' approximately symmetrical with respect to the vertical longitudinal plane. Each cowling 132, 132' has a semi-cylindrical shape and comprises a first edge 136, 136' connected by a connection 134, 134' to the mast 54, and a second edge opposite the first edge 136, 136'.

In accordance with one embodiment, the connection between each cowling 132 and 132' and the mast 54 is a pivot connection, each cowling 132, 132' being movable relative to the mast 54 about a pivot axis 138, 138' between an open position, in which the second edges of the cowlings 132, 132' are spaced apart, and a closed position, in which the second edges are joined, a locking/unlocking system ensuring that the cowlings 132, 132' are held in the closed position. In this closed position, the cowlings 132, 132' are rotationally fixed about the axis X relative to the fan casing 70.

The connection 134, 134' preferably comprises, for each cowling 132, 132', at least one connection element 140, 140' disposed in a transverse plane, connected on the one hand to the primary structure 76 of the mast 54 and on the other hand to the cowling 132, 132'.

The connection elements 140 connecting the first cowling 132 to the primary structure 76 of the mast 54 are advantageously aligned with the connection elements 140' of the second cowling 132' in order to limit the occurrence of moments in the primary structure 76.

In accordance with a first configuration, the connection elements 140, 140' are fixed relative to the primary structure 76. In accordance with one embodiment, the connection elements 140, 140' are present in the form of at least one bracket 142 disposed in a transverse plane, of which the central part is fixed to the upper stringer 78 of the primary structure 76 and which extends on either side of the primary structure 76, symmetrically, the bracket 142 comprising a bore 144, 144' at each end, a first bore 144 assuring the guidance of the pivot axis 138 of the first cowling 132, and the second bore 144' assuring the guidance of the pivot axis 138' of the second cowling 132'.

In accordance with a second configuration, the connection elements 140, 140' are hinged relative to the primary structure 76 of the mast 54. In accordance with one embodiment, the connection elements 140, 140' are lateral rods 146, 146' disposed on either side of the primary structure 76, each lateral rod 146, 146' comprising a first end connected, thanks to a joint 148, to a plate 150 fixed on the upper stringer 78 of the primary structure 76 and a second end which comprises a bore 152, 152' assuring the guidance of one of the pivot axes 138, 138' of the cowlings 132, 132'.

Depending on the situation, the joint 148 is a pivot connection with a pivot axis oriented along the axis Z as illustrated in FIGS. 9 and 10 or with a pivot axis oriented along the axis X.

In accordance with the second variant, the connection elements 140, 140' are symmetrical with respect to the vertical longitudinal plane. As illustrated in FIGS. 9 and 10, some connection elements 140, 140' can be fixed and others hinged relative to the primary structure 76 of the mast 54.

Regardless of the variant, the connection 106 of the front engine attachment which directly or indirectly connects the primary structure 76 and the fan casing 70 comprises at least one pair of connection elements disposed in a transverse plane, symmetrically with respect to the primary structure 76, each connection element being connected on the one hand to the primary structure 76 and on the other hand to the fan casing 70 or to at least one nacelle element rotationally fixed about the axis X with respect to the fan casing 70. Thus, these connection elements 120, 140, 140' assure the take-up of forces along the axis Y and/or a torque along the axis X. The connection of the connection elements to the fan casing makes it possible to space these apart from the axis of rotation 62 of the engine 52 and to increase their ability to take up the forces along the axis Y and/or a torque along the axis X.

In accordance with the invention, forces oriented vertically along the axis Z are taken up by the front rod(s) 104 and not by the connection 106, and forces along the axis Y and/or a torque along the axis X are taken up by the connection 106 and not by the front rod(s) 104. Separating the take-up of forces or torques between the engine and the mast makes it possible to optimize the configuration of the front rod(s) 104, which are designed to take up forces along the axis Z, and the configuration of the connection 106, which is designed to take up forces along the axis Y and/or a torque along the axis X.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine unit comprising an engine, a mast and a nacelle in which there is positioned the engine,
   the engine comprising:
      a core which comprises a stator, a rotor, and a front bearing between the stator and the rotor, the rotor pivoting about an axis of rotation relative to the stator and the front bearing assuring the guidance in rotation of the rotor relative to the stator and positioned further to a front of the engine,
      a fan connected to the rotor and positioned in a fan casing,
   the mast comprising a primary structure connected to the engine by an engine connection which comprises:
      a rear engine attachment which connects an intermediate part of the primary structure and the core of the engine,
      a front engine attachment which connects a front end of the primary structure and the engine, and
      at least two thrust rods,
      the front engine attachment comprising
      at least one connection which connects the primary structure of the mast and the fan casing of the engine, and
      at least one front rod which connects the primary structure of the mast and the core of the engine, and
      wherein each front rod is connected at a first end to a front end of the primary structure of the mast by a connection pivoting about a horizontal axis perpendicular to the axis of rotation, and is connected at a second end to the stator of the engine by a connection pivoting about a horizontal axis perpendicular to the axis of rotation, wherein an orientation of the front rod is convergent with the axis of rotation in a plane perpendicular to the axis of rotation, the plane perpendicular containing the front bearing assuring the guidance in rotation of the rotor relative to the stator and positioned further to the front of the engine.

2. The aircraft engine unit of claim 1, wherein each front rod is directly connected at the first end to the front end of the primary structure of the mast.

3. The aircraft engine unit according to claim 1, wherein the connection which connects the primary structure of the mast and the fan casing comprises at least one pair of connection elements disposed in a plane perpendicular to the axis of rotation, each connection element of the pair being symmetrical to the other connection element with respect to the primary structure, each connection element being connected to the primary structure and to the fan casing or to at least one element of the nacelle rotationally fixed about the axis of rotation with respect to the fan casing.

4. The aircraft engine unit according to claim 3, wherein the connection comprises two lateral rods, each comprising a first end connected to the primary structure by a connection pivoting about an axis parallel to the axis of rotation and a second end connected to the fan casing by a connection pivoting about an axis parallel to the axis of rotation.

5. An aircraft comprising at least one engine unit comprising an engine, a mast and a nacelle in which there is positioned the engine, the engine comprising:
    a core which comprises a stator, a rotor, and a front bearing between the stator and the rotor, the rotor pivoting about an axis of rotation relative to the stator and the front bearing assuring the guidance in rotation of the rotor relative to the stator and positioned further to a front of the engine,
    a fan connected to the rotor and positioned in a fan casing,
the mast comprising a primary structure connected to the engine by an engine connection which comprises:
    a rear engine attachment which connects an intermediate part of the primary structure and the core of the engine,
    a front engine attachment which connects a front end of the primary structure and the engine, and
    at least two thrust rods,
the front engine attachment comprising
    at least one connection which connects the primary structure of the mast and the fan casing of the engine, and
    at least one front rod which connects the primary structure of the mast and the core of the engine, and
wherein each front rod is connected at a first end to a front end of the primary structure of the mast by a connection pivoting about a horizontal axis perpendicular to the axis of rotation, and is connected at a second end to the stator of the engine by a connection pivoting about a horizontal axis perpendicular to the axis of rotation, wherein an orientation of the front rod is convergent with the axis of rotation in a plane perpendicular to the axis of rotation, the plane perpendicular containing the front bearing assuring the guidance in rotation of the rotor relative to the stator and positioned further to the front of the engine.

\* \* \* \* \*